Nov. 16, 1943. R. G. LAWRY ET AL 2,334,337
SEPARATOR AND VALVE THEREFOR
Filed April 11, 1941 4 Sheets-Sheet 1

INVENTOR.
Raymond G. Lawry
Carl V. Ore
BY Richardson and Auer
Attys.

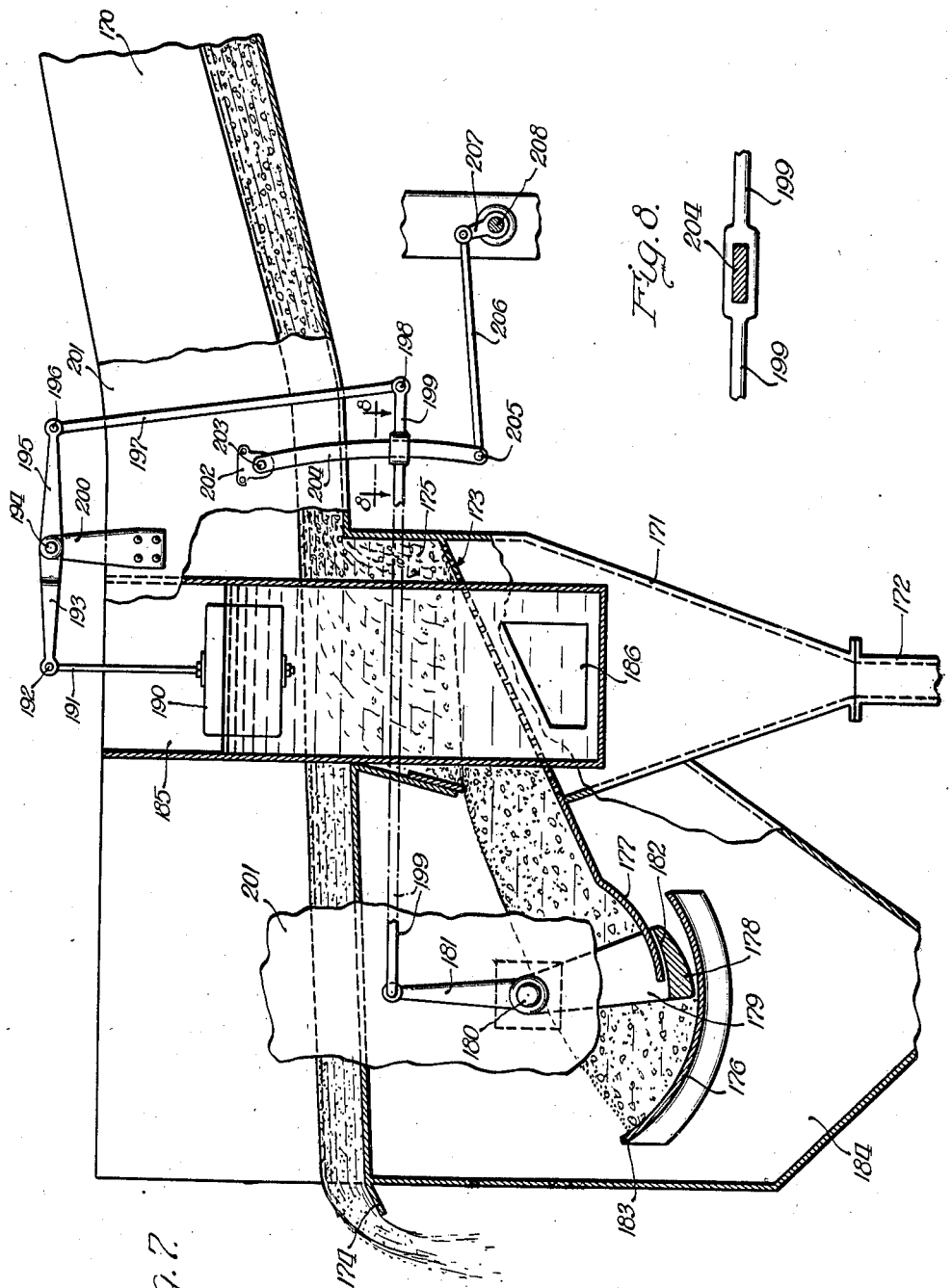

Patented Nov. 16, 1943

2,334,337

UNITED STATES PATENT OFFICE 2,334,337

SEPARATOR AND VALVE THEREFOR

Raymond G. Lawry, Chicago, and Carl V. Ore, Harvey, Ill., assignors to Roberts and Schaefer Company, Chicago, Ill., a corporation of Illinois Application April 11, 1941, Serial No. 388,028

6 Claims. (Cl. 209—496)

This invention relates generally to separators or concentrators, for example, gravity separators, and is particularly concerned with new and improved valves or gates for such separators or related machinery.

The designation "gravity separator" or equivalent language employed herein refers to machinery or devices such as used, for example, in the ore or coal dressing art, but is not intended to limit the invention either to such specific machinery or to its use in any specific field. Gravity separators in which the invention has been actually used are noted for explanatory purposes. They are machines wherein a segregated raw material, such as coal, ore or other mineral, is treated for separating it into its component parts according to the specific gravities of the particles thereof. The object of the treatment, as in the case of coal, may be to save the light material (clean coal) and to reject impurities and admixtures of heavier specific gravities occurring in the raw feed in the form of so-called bony coal, shale, slate, rock, pyrite, tramp iron or the like, or, as in the case of certain ores or minerals, the object may be to save the heavy components and to reject particles of lighter specific gravities.

Many devices of this general type are known. All of them employ the principle of gravity separation according to which the raw material is agitated by suitable means so as to stratify in layers for discharge or removal, the heavier particles gravitating downwardly, the lightest particles collecting on top, and particles of intermediate gravities (middlings) massing at an intermediate level. The agitation of the material bed in such an apparatus may be accomplished in various ways, for example, mechanically, hydraulically, pneumatically, or by a combination of suitable agitating means. Among the best known devices of this kind are the "jig" or "concentrator cell" usually employing hydraulic agitation; the so-called "dry-cleaner" or "air-cleaner" using air impulses injected into the material bed; certain types of "wet washers" or "hydro-separators" employing hydraulically agitated separating pockets depending from a feed trough containing the material bed; and apparatus using fluid media or making use of heavy density fluid media with or without uprising currents or mechanical agitation, for floating the light material and permitting the heavy constituents to drop downwardly for discharge.

Whatever the particular structure and operation of such devices may be, supply and discharge valves, gates or gears are usually provided for controlling the flow of material relative to the point or space where the separation is accomplished. The gates, valves or gears (the terms are interchangeably used) may also be of different structures; for example, they may be made in the form of movable plates disposed in or adjacent to a discharge duct or feed passage, or in the form of rotatable wheels, so-called star wheels, arranged within a housing disposed within or adjacent to a discharge duct or feed passage and operating to move the material. These valves are important parts of the corresponding machine or device and are known to cause a good deal of trouble. The principal requirements that could be formulated for these valves would include:

1. Positive and reliable operation within a predetermined range from zero to maximum delivery;

2. Adjustability, that is, slow-up or acceleration, with respect to material to be delivered or moved at any time according to the needs of the machine;

3. Uniform delivery in any adjusted operating position;

4. Freedom from clogging, jamming or packing;

5. Ability to handle any common admixture that may occur in the feed without detriment to its intended functions;

6. Structural and functional adaptability for gang operation with common drive for several valves and individual adjustment for each valve; and 7. Coordination of discharge valve or valves with the supply or feed equipment.

The valves known heretofore do not fulfill these requirements with the desired certainty and reliability. The rotary valve which is probably most widely used may be taken as an example to illustrate the point: Such valve comprises a rotatable shaft with radially or angularly disposed blades. The valve rotates within a housing which may be arranged, for example, within or as a part of a discharge duct or chute. It may be driven either by a constantly operating chain drive engaging a sprocket on the valve shaft, or by a reciprocating pawl which is actuated constantly during the operation of the machine so as to drive the valve by engaging a ratchet attached to the shaft.

The rotary speed of such a valve may be varied within certain limits, for example, by adjusting the throw of the pawl with respect to the ratchet, or in the case of a chain drive, by suitable gear reduction mechanisms; but it is impossible in practical operation to slow down the valve below a certain speed which is usually too high for certain requirements. This drawback is particularly manifest in the case of gang operation where a plurality of valves are operated from a common drive. The requirement for adjustability (assuming, of course, constant operation of the main drive) with respect to zero delivery is therefore lacking.

Another shortcoming resides in the tendency of such a valve to pack or clog. It may happen, for example, particularly in the case of handling finely divided wet materials, that the radial space between the blades of a rotary valve packs solidly with material, forming as it were a solid cylinder, which rotates within its casing in the discharge or delivery duct without moving any material. The valve therefore does not fulfill the requirement calling for freedom from clogging or packing.

Trouble is also frequently experienced with such valves in the presence of certain impurities or admixtures, for example, tramp iron. The valve jams rather easily, held by a piece of tramp iron or other admixture which may be lodged between the tip of one of its blades and the wall of the housing, or across the feed or discharge orifice, stopping material delivery altogether.

Other troubles may occur with such valves, and also with the previously indicated, differently constructed valves, but the examples given above will suffice to show that known valves do not operate according to reasonably formulated, let alone ideal, operating requirements. The result is expressed in frequent stoppage, breakage of equipment, loss of operating time, and expenses for repair and replacement of parts.

A critical appraisal of the known valve structures reveals that they attempt to control the material movement by narrowing or constricting the passages through which the material has to move, or by forcing amounts of material through predetermined channels. This basic principle requires structures which effect an obstruction of the material passages, and the obstruction, no matter how it may be controlled, is probably responsible for the troubles noted before.

The valve made in accordance with our invention avoids these troubles and drawbacks. The free passage of material is promoted instead of obstructed. The new valve, employing novel principles, fulfills the previously enumerated requirements and objects, and contributes other advantages, all of which will appear from the detailed description rendered below with reference to the drawings. In these drawings, Fig. 1 is a partial more or less diagrammatic section through a separator, for example, a jig or concentrator cell, showing a rotary discharge wheel or valve to illustrate one example of the prior art;

Fig. 7 is a diagrammatic sectional view through a hydro-separator using the valve or valves made according to the invention.

Like parts are designated by like reference numerals throughout the drawings. Details and elements which may be assumed to be well known in the art will be described only to the extent required for supporting the understanding of the invention.

Figure 1:
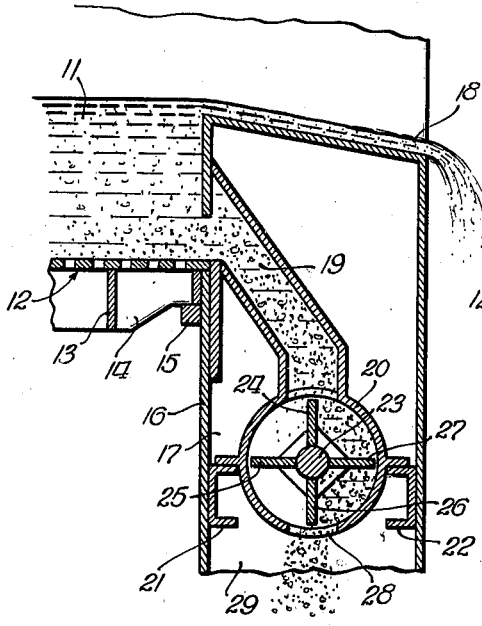

Referring now to Fig. 1, numeral 11 indicates generally a separating compartment in a jig or concentrator cell of well known structure. The bottom or deck plate 12 of the cell is provided with perforations so as to admit into the separating compartment 11 water impulses for the purpose of agitating the material supplied to the separating chamber. Numeral 13 designates a reinforcing and supporting rib for the perforate bottom plate 12, and 14 indicates a mounting member for the bottom plate. At 15 is shown another mounting member secured to the wall 16 of the discharge section 17. The light material collects on the top of the material bed and is discharged over the overflow 18, and the heavy material, which gravitates downwardly responsive to the hydraulic agitation, collects at the bottom and is removed by way of the discharge chute 19. This chute is provided with a circular housing 20 which may be suitably mounted on U-beams 21 and 22 and contains the star wheel comprising the rotatable shaft 23 and the blades 24, 25, 26 and 27 which are mounted on the shaft and are rotatable with it. The heavy material (in the case of coal refuse) is discharged through the opening 28 into the refuse compartment 29, responsive to rotation of the star wheel, and may be removed from this compartment by means of a suitable conveyor.

This valve clearly demonstrates the use of the old principle of controlling the material movement by constriction or obstruction of the discharge channel. The material passage is completely blocked by the blades of the wheel, in the position shown, the outer edges of the wheel practically rubbing against the wall of the housing 20. Such a valve, as every other valve employing this basic operating principle, requires considerable power for its operation and causes the previously noted difficulties.

Figure 2:
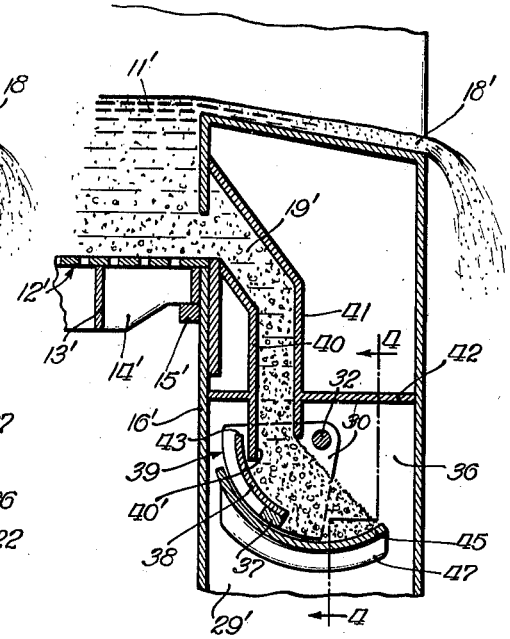
Fig. 2 represents a view similar to Fig. 1, but showing the use of a valve or gate made in accordance with the present invention.

Fig. 2 shows a section of a separator concentrator such as discussed with respect to Fig. 1, in the same diagrammatic representation, but using a valve made in accordance with the present invention. Parts or details shown in Fig. 2, which are identical with those shown in the structure Fig. 1, are marked by identical, but primed, reference numerals. Thus we have again a separating compartment or chamber 11', wherein the material masses on a perforate bed plate 12', the latter resting on mounting members 13', 14' and 15', and separates responsive to agitation in accordance with the specific gravities of the particles thereof. The heavy material is discharged at one end of the concentrator into the chute 19', and the light material, for example, clean coal, in the case of a coal cleaner, is discharged by way of the overflow 18'. There may be a separate discharge for the middlings, if desired.

The new valve comprises two segment-shaped plates 30 and 31 (also see Fig. 4) firmly secured to a shaft 32. This shaft extends transversely through the corresponding upper portion of the discharge compartment 29' and is rotatably mounted in the bearings 33 and 34 secured to the walls 35—36. The segmental plates 30 and 31 are interconnected by means of a scraper bar 37, and attached to this bar is a curved shield or tray plate 38. The curvature of this plate may conform generally to the curvature of the outer edge 39 of the two segment-shaped plates 30 and 31 or, rather to say, to the curvature of the stationary tray 45. The segment-shaped plates 30 and 31 and the interconnecting scraper 37 holding the curved shield or tray plate 38 thus form a unit which is firmly attached to the rotatable shaft 32 and is rotatable therewith relative to the concave stationary tray 45. The tray 45 constitutes a fixed subfloor and the tray 38 a movable subfloor arranged above it.

The discharge chute 19' comprises the two walls 40 and 41 which project through the partition 42 downwardly into the upper portion of the discharge compartment 29', the wall 40 constituting the floor and the wall 41, the roof of the chute. The wall 41 is shorter than the wall 40 and its lower edge is substantially in alignment with the shaft 32, as shown. The wall 40 (floor) is provided with an extension 40' stopping just short of the curved plate 38 in such a manner that the edge 43 of this plate is located in back of the extension 40'. This downwardly projecting extension 40' of the floor of the chute operates in the manner of a scraper relative to the movable subfloor 38. It may be made a separate part if desired.

The stationary subfloor (tray 45) is arranged underneath the movable subfloor (tray plate 38), as shown, extending transversely across the discharge or refuse compartment and being attached to the side walls 35 and 36 by means of the flanges 46 and 47. The concave side or surface of the fixed subfloor is curved so as to conform to the arcuate motion of the scraper or feeder bar 37 of the movable subfloor which is attached to the segment-shaped plates.

Figure 4:
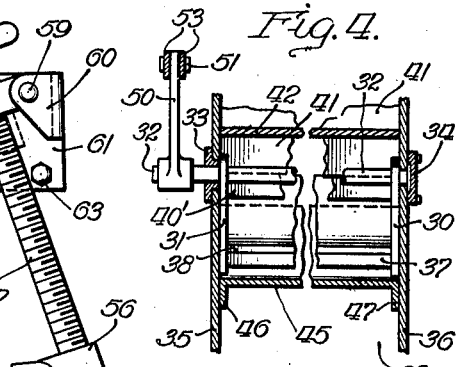
Fig. 4 is a section through the separator or jig equipped with the new valve taken along line 4—4 in Fig. 2.

The shaft 32 projects from the structure at one end thereof and carries an operating lever 50, as shown in Fig. 4. If this lever were oscillated (in a reciprocating or swinging motion in counter-clockwise and clockwise direction, respectively, as seen in Fig. 2), the segment-shaped end plates 30 and 31 would take part in this motion and would therefore reciprocate or oscillate the shield or tray 38 (movable subfloor) and discharge or scraper bar 37 relative to the stationary subfloor 45.

Assuming that the valve shown in Figs. 2 and 4 is at rest, that is, that there is no reciprocating motion of the valve, the heavy material collecting at the bottom of the separating chamber 11' will drop down through the discharge chute 19' and will mass on the movable subfloor 38 and on the stationary subfloor 45 substantially as shown in Fig. 2. The various parts are dimensioned and arranged in such a manner that the material collecting on these trays or subfloors assumes an angle of repose at which substantially no downward discharge can take place, from the right hand edge of the tray 45 (see Fig. 2) into the refuse compartment 29'. Discharge takes place, however, responsive to actuation of the valve, that is, responsive to rotary oscillating motion of the shaft 32 which holds and oscillates the segment-shaped plates 30 and 31, and therefore the scraper or discharge bar 37 and the shield or tray-like subfloor 38. The amount discharged with one effective discharge stroke (counter-clockwise motion of scraper 37) and permitted to drop over the right hand edge of the stationary tray 45 (see Fig. 2) downwardly into the refuse compartment 29' is substantially a function of the displacement of the scraper bar 37.

The shield or movable subfloor 38 which oscillates with the discharge bar 37 has a protective and controlling function. It moves in the manner of a shield relative to the fixed depending edge of the wall 40 of the floor of the discharge chute and in back of this edge, and thus confines the discharge to the right hand end of the concave tray 45 and also acts in the manner of a tray, receiving material from the floor of the discharge chute.

During the clockwise arcuate motion of the tray 38 (return stroke), the extension 40' acts in the manner of a fixed scraper forcing a certain amount of material to move from the movable subfloor 38 on to the fixed subfloor. Practical experiments have demonstrated that substantially no discharge takes place at the left hand end of the subfloor 45 or in back of the subfloor 38.

This structure and control confines the discharge to a definite place, controls and determines the amounts to be discharged at any time, and provides for a uniform discharge at any setting or adjustment of the valve. The discharge passage is spacious at any point of the valve; that is, we do not rely on any narrowing of the discharge passage that may cause clogging, packing or jamming. The discharge space at the right of the fixed tray or subfloor 45 may be provided as wide as may be required or necessary so as to permit free and unimpeded passage of any piece or admixture that may drop through the discharge chute.

An analysis of the structure and operation of the new valve will disclose dual functions for the several elements of which it is composed. The valve can be described, for example, as comprising a stationary tray 45 for receiving material, and a movable scraper 37 for removing measured amounts of material therefrom, together with means for confining the removal of material to one end or edge of the stationary tray. Looking at the structure from a different angle, the shield 38 operates in the manner of a tray which receives material and the depending extension of the wall 40 acts as a scraper to remove or cause discharge of measured amounts of material from the movable tray. The extension 41' also operates, alone or together with the shield or tray 38, as a material feeder for the stationary tray 45.

In the specific embodiment shown herein as an example, the discharge passage is free and remains unobstructed throughout the operation of the valve. The flow of material is stopped (zero discharge) merely by allowing the material to seek its own natural angle of repose. The valve thus makes use of natural gravitational forces instead of impeding them by force, and in doing so it provides for a more reliable operation and uses less power for operation than previously known valves. Linear reciprocating motion may take the place of the arcuate movement of the scraper and movable tray. The end plates 30—31 are segment-shaped, but they can receive different forms if desired.

Figure 3:
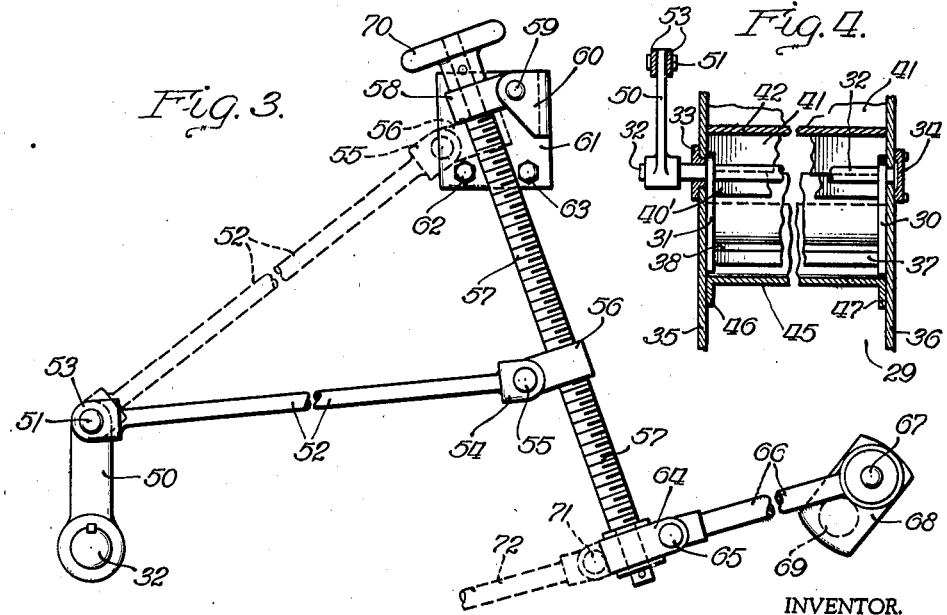
Fig. 3 illustrates, on an enlarged scale, one embodiment of an operating mechanism for the new valve.

Fig. 3 shows, on an enlarged scale, one embodiment of a mechanism for oscillating the shaft 32 in a controlled manner so as to reciprocate the discharge and feeder bar 37 through its arcuate path relative to the curved tray 45. Pivotally attached to the arm 50 at point 51 is a link 52. The pivotal attachment may be made by means of forked extensions 53 at the corresponding end of the link 52. Similar forked members 54 may be provided at the other end of the link 52 for pivotal attachment at point 55 with a nut 56 which is in threaded engagement with a screw shaft 57. This screw shaft is journalled at its upper end in a bearing 58, and this bearing in turn is rotatably mounted at 59 in a bracket 60 which is part of a mounting plate 61. The mounting plate may be attached to the wall of the machine, for example, by bolts 62 and 63. The lower end of the screw shaft 57 is journalled in a bearing member 64 which is in pivotal engagement at 65 with a link 66. The other end of this link may be pivotally mounted at 67 on a crank arm or eccenter 68 which may be rotated by means of a shaft 69. The drive 69—68—67—66 may be actuated constantly while the machine is in operation. The adjustment of the valve from zero to maximum discharge is carried out by the screw shaft as described below.

The screw shaft 57 carries at its upper end the hand wheel 70 which is keyed to it and by means of which the screw shaft can be rotated in its bearings 58 and 64 so as to dispose the nut 56 at any desired point. Assuming that the nut 56 is placed on the screw shaft 57 in the uppermost position in which it is shown in dotted lines, the pivot points 51—55—59 will be in alignment and a swinging or oscillating pendulous motion imparted to the screw shaft 57 by the rotation of the crank 68 will have substantially no effect on the arm 50 attached to the valve shaft 32. If we assume, on the other hand, that the screw shaft 57 has been rotated by the hand wheel 70 so as to dispose the nut 56 in the extreme low position, that is, adjacent to the bearing or journal 64, the result will be a maximum reciprocating displacement of the valve because the full swinging or pendulous motion of the screw shaft 57 responsive to rotation of the the crank 68 will be transmitted through the link 52 to the arm 50. The first noted position of the nut 56 and link 52 (indicated in dotted lines in Fig. 3) corresponds to zero or no delivery of the valve, and the last noted position (nut 56 adjacent to bearing 64) corresponds to maximum operation of the valve, or maximum delivery. Between these two points, from zero to maximum delivery, which can be predetermined by properly dimensioning the parts, there are infinited graduations simply by the proper setting of the nut 56 on the screw shaft 57. The shaft 68 may be constantly rotated while the machine is in operation, but the throw of the crank 68, although it is fully transmitted to the screw shaft 57, is effective only in accordance with the adjustment or setting of the nut 56 (and also link 52), as described. The device therefore functions in the manner of a gear interposed between the crank 68 and the operating arm 50.

The bearing 64 which journals the lower end of the screw shaft 57 may be made as shown in full lines in Fig. 3, or it may be provided with an extension 71 for pivotally securing a link 72 which may extend to another gear just like the one shown in Fig. 3 for operating a second valve either on the same machine or on another unit.

Attention is called to the fact that Fig. 3 is diagrammatic throughout and intended solely for explanatory purposes. The various parts have been placed in this drawing on exaggerated angles so as to facilitate the understanding. It will be clear that all these parts can be dimensioned and disposed with respect to each other in such a manner as to perform as explained above.

Figure 5:
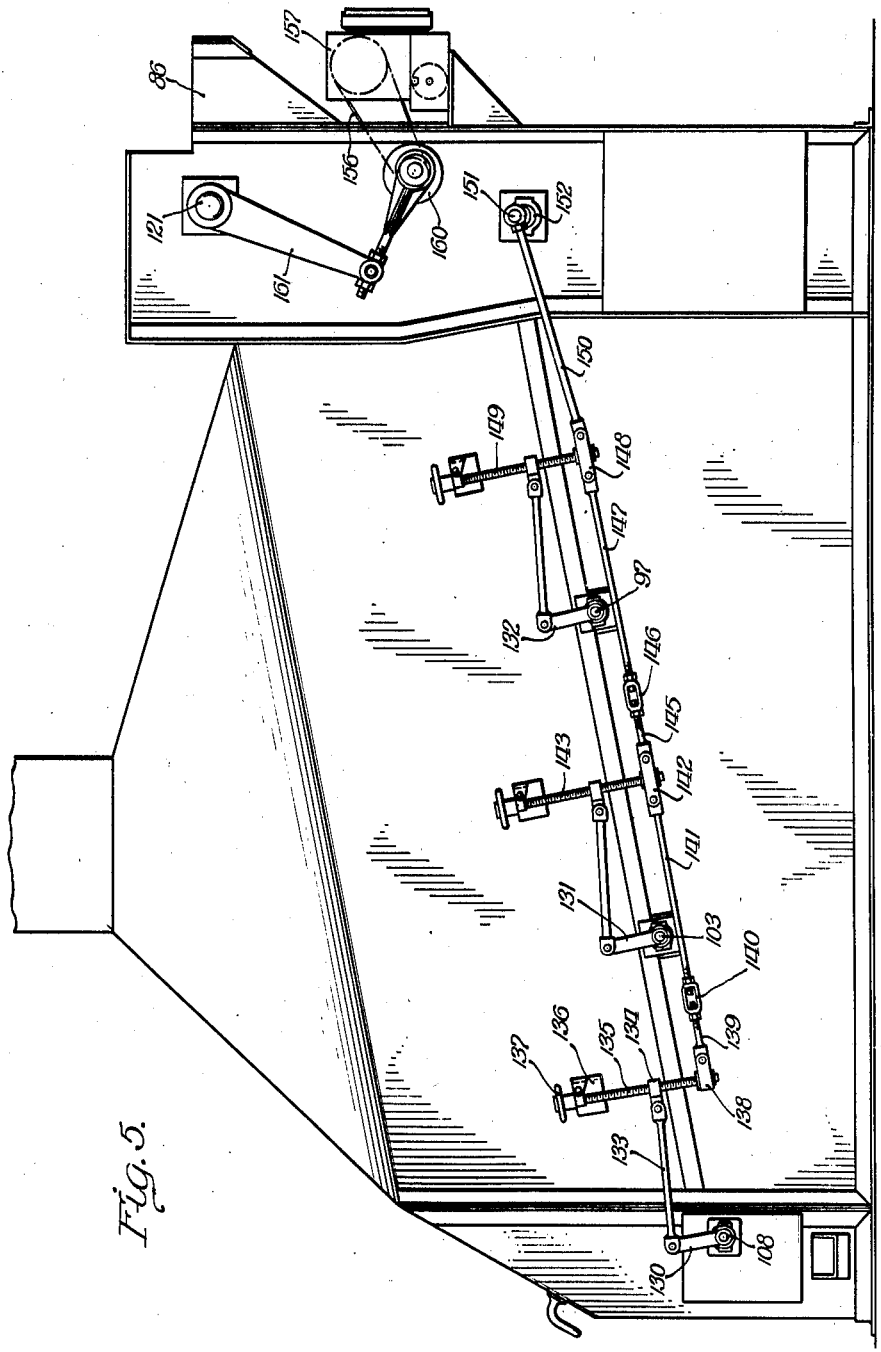
Fig. 5 is a somewhat diagrammatic plane view of a specific type of apparatus, a so-called air cleaner, using valves according to the invention.
Figure 6:
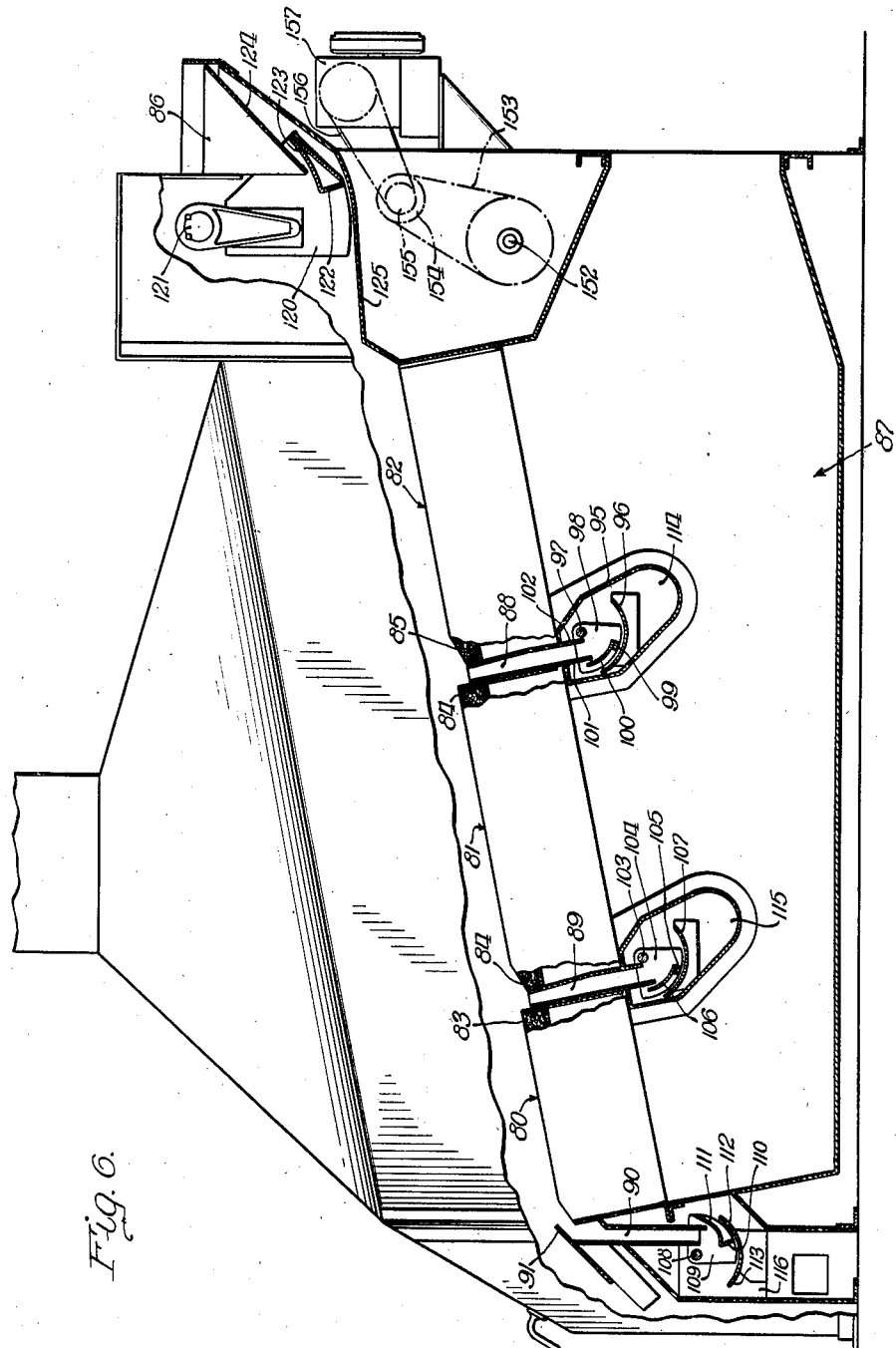
Fig. 6 represents the machine shown in Fig. 5 in partial plane and sectional views, to show the placement and operation of the new valves in a coordinated gang assembly.

Another practical example of using the invention is shown in Figs. 5 and 6 which illustrate in a diagrammatic manner an embodiment of a so-called air flow cleaner of a well known structure such as is described in any one of several prior patents and other publications. All details not necessary for understanding the invention have been omitted from Figs. 5 and 6. This cleaner comprises a housing containing a sloping material deck which may comprise three sections 80, 81 and 82, as shown in Fig. 6. Each deck or section of the deck may comprise a layer of air-pervious material such as indicated at 83 (deck section 80), 84 (deck section 81) and 85 (deck section 82). The raw material is supplied or delivered at the right hand end of the machine through the supply chute 86 which may be connected with a suitable bin. The material moves from right to left downwardly along the deck, and its motion is determined and controlled by air currents injected into the air chamber 87 which is disposed underneath the deck or deck sections. The air impulses go through the air-pervious deck or decks and loosen up the material bed so as to effect a stratification of the material according to the specific gravities of the particles thereof. Intermediate discharge chutes for the heavy material are provided at 88 and 89, as shown. At the left hand end of the machine is a discharge chute 90 for the middlings and an overflow or discharge 91 over which the light material (coal, for example) is discharged. Each of these discharge chutes may be provided with a valve device such as described in connection with the structure (Figs. 2, 3 and 4).

The compartment 114 receiving material from the intermediate discharge chute 88 is indicated diagrammatically by its side walls 95. In this compartment is provided the curved or concave stationary tray 96, and a valve shaft 97 projects through the structure. Attached to this shaft are the suitably shaped end plates 98. A discharge plunger or bar 99 interconnects the end plates 98, and a shield or movable tray or subfloor 100 is attached to the bar 99, all in accordance with the previously described details. The wall 101 of the chute 88 projects downwardly (a separate member may be provided in place of this extension), forming a fixed floor and scraper member in front of the shield or movable subfloor 100, and the wall 102 is somewhat shorter, so as to permit the proper downward movement of the material.

The valve structure coacting with the discharge chute 89 is exactly like the one coacting with chute 88, comprising the shaft 103; the end plates 104; and the discharge plunger or bar 105 with its movable subfloor or tray 106 oscillating responsive to the actuation of the shaft 103 in a pendulous motion relative to the stationary subfloor or tray 107.

The valve coacting with the discharge chute 90 is similar to the previously described valves, except that its position is reversed for operative reasons. The valve has its shaft 108 and its suitably shaped end plates 109. These end plates are interconnected by means of a shaped member which may be formed of sheet material to provide a front wall or scraper surface 110, taking the place of the discharge or scraper bar of previously described valves, and the rear section 111, taking the place of the shield or movable tray or subfloor 106 and 100 of the valves provided underneath the chutes 88 and 89, respectively. A curved or concave stationary subfloor 112 is disposed underneath the movable subfloor. This last noted valve discharges over the left hand edge 113 of the subfloor 112, while the other valves discharge over the right hand edges of the subfloor 107 and 96, respectively.

The operation of these valves is similar to and is believed to be self-explanatory from the remarks previously made with respect to the valve structures already described in detail. The valve coacting with the chute 88 discharges into the compartment 114; the valve coacting with chute 89 discharges into the compartment 115; and the valve coacting with the chute 90 discharges into a suitable middlings compartment 116. Each of these compartments may be provided, as desired or necessary, with suitable conveyor means for removing the materials deposited therein.

This separator may also be provided with a supply valve shown in Fig. 6 at the upper right hand end of the structure. The supply valve may again be of a structure such as previously described, comprising, as indicated in Fig. 6, segment-shaped end plates 120 movably connected with a shaft 121 and transversely or crosswise interconnected by a member having a front wall 122 and a shield or movable tray or subfloor section 123. The latter may be made of sheet material firmly attached at each end to the segment-shaped plates 120, for example, by means of welding. The front wall 122 acts as a feeder and scraper bar, discharging measured or controlled amounts of material from the supply bin 86 into the separator. It will be observed that the protective shield or movable subfloor or tray 123 is disposed in back of the fixed floor 124 of the supply bin, this fixed floor constituting a scraper member such as the floor extension 40' in Fig. 2. The surface 125 constitutes, in this embodiment, a member operating in the manner of the stationary subfloor or tray 45 shown in Fig. 2. The operation of this supply valve is similar to the operation of the other previously described valves. The wall 122 of the cross member which interconnects the segment-shaped plates 120 acts in the manner of a plunger or feeder bar pushing or feeding controlled amounts of material from right to left on to the fixed subfloor or stationary tray 125 and from there into the machine responsive to the actuation of the shaft 121. If the supply valve is stopped, that is, if there is no oscillating or reciprocating motion, then the material dropping downwardly through the supply chute or bin 86 will collect on the fixed subfloor or stationary tray 125 and on the movable subfloor or tray 123 and will mass thereon at an angle of repose exactly as the material discharged through the chutes 88, 89, 90 will mass on the trays or fixed subfloors 96, 107, and 112, respectively.

Fig. 5 shows the machine and the operating mechanism for the various valves from the outside. The valve shaft 108 of the valve coacting with the discharge chute 90 (middlings chute) is provided with an operating arm 130. A similar operating arm 131 is keyed to the shaft 103 of the valve coacting with the discharge chute 89, and a similar operating arm 132 is attached to the shaft 97 of the valve coacting with the discharge chute 88. Each valve has its own actuating and adjusting means which, in the case of the valve having the operating arm 130, comprises the link 133 pivotally attached to the nut 134 which is in threaded adjustable engagement with the screw shaft 135. This screw shaft is pivotally mounted in a bearing attached to the fixed bracket 136 and is provided with a hand wheel 137 for adjusting the position of the nut 134 (and link 133) on the screw shaft. A bottom bearing 138 journals the screw shaft 135 at its lower end. This bottom bearing is in pivotal engagement with a link 139 which is connected by means of a turnbuckle 140 to a link 141 pivotally connected to a bearing 142 which journals the screw shaft 143 of the setting and adjusting device for the arm 131 attached to the shaft 103 which is part of the valve coacting with the intermediate discharge chute 89 (see Fig. 6). The bearing 142 for the screw shaft 143 is pivotally connected with a link 145 attached to a turnbuckle 146 which connects with a link 147. The latter is in pivotal engagement with a bearing 148 for the lower end of the screw shaft 149 which is part of the adjusting and setting mechanism for the valve coacting with the intermediate discharge chute 88. The journal or bearing 148 is pivotally connected with the link 150, and this last named link is finally connected with a bearing pivoted at 151 on a suitable crank arm or eccentric which is operated from a shaft 152.

The shaft 152, as shown in Fig. 6, may be rotated by suitable means, for example, a chain drive 153, from a sprocket 154 on a shaft 155 which is rotated by a suitable drive, for example, a belt or chain 156 from a gear 157 operable by a suitable motor. The gear may be an adjustable or variable speed reduction gear so as to determine and adjust the speed of rotation of the shaft 152 and therewith the oscillating speed of the various valves.

It is desirable to coordinate the operation of the feed or supply valve (see Fig. 6, upper right corner) with the speed of the discharge valves. This is accomplished by providing on the shaft 155 (Fig. 6) a cam or eccenter drive 160 (Fig. 5) for actuating the arm 161 which oscillates the supply valve shaft 121. Therefore, the oscillating speed of the supply valve will always be correlated with the oscillating speed of the various discharge valves. The stroke of the supply valve is adjustable by means of nuts employed for fixing the arm 161 on the arm attached to and actuated by the cam drive 160.

Fig. 7 indicates how the invention can be applied to a concentrator or separator of an entirely different type, namely, a so-called hydroseparator, examples of which are shown in U. S. Patents 1,594,626 and 1,760,293. Fig. 7 shows an embodiment of such a separator diagrammatically, partly in plane view (wall sections 201) and partly in superimposed sections (section of float chamber 185 and sectional view of the separator pocket 175 and trough 170).

The separator comprises a downwardly sloping trough 170. The raw material, for example, coal, may be supplied to this trough, together with a liquid, for example, water. At one or at several points the trough may be provided with so-called separating pockets, one of which is shown in Fig. 7 at 175. An uprising column of water is supplied to this pocket through the structure 171 provided with the inlet 172. The pocket is equipped with a perforated plate 173 through which the water current rushes upwardly into the material dropping downwardly from the sloping trough 170. The light material (for example, coal) is rejected by the uprising current of water coming through the perforated plate 173 and floats off to the discharge end 174 shown at the left of the drawing. The heavy material drops into the pocket 175 and moves on to the fixed discharge floor 177 where it masses for discharge on the exposed surface 182 of the member 178 (movable tray or subfloor) and on the exposed portion of the fixed subflow or stationary tray 176. The member 178 acts as a discharge bar or scraper. It is mounted between two suitably shaped, for example, segment-shaped, end plates 179 just like the previously described structures. These end plates are connected with a shaft 180 which may be oscillated by means of an arm 181. We therefore have again a similar structure and the use of the same principles already discussed in connection with other embodiments, namely, a valve which comprises a fixed floor (177), a reciprocating subfloor (178) which may be a bar, plunger or scraper provided with a discharge control protecting surface operating in the manner of a shield in back of a fixed floor 177 and coacting with a fixed subfloor or stationary tray 176, the various parts being disposed so that the material collected for discharge seeks an angle of repose which prevents discharge in the stop position of the valve, and acting in such a manner that the material can be discharged in only one direction and in measured amounts, that is, in this embodiment over the left hand edge 183 of the fixed tray or subfloor 176. The discharged material drops into the compartment 184 from which it may be removed by suitable means, for example, by a suitable conveyor. There is no obstruction at any point, every component part or piece of the material dropped into the pocket 175 can be discharged by the valve without danger of clogging or jamming. The amounts discharged at any stroke of the valve will be uniform.

In order to control the valve and to adjust its stroke in accordance with the needs of the machine, there is provided a separate compartment 185 which is disposed alongside the trough 170 and alongside the separating pocket or pockets such as 175, and is interconnected with the separating pocket and with the sloping trough by a transverse channel indicated at 186, somewhat in the manner described in the previously noted patents. The section of the separate compartment 185 as shown in this drawing is therefore superimposed upon the section of the separating pocket 175 and the trough 170; that is, the compartment 185 is disposed in a plane which is perpendicularly outside and in front of the plane of the separating pocket and the trough. The communicating duct 186 is a hydraulic communication and, therefore, liquid will collect in the compartment 185 in a substantially quiescent condition. The liquid level in this compartment is a function of the resistance to the uprising water current that may at any time obtain in the pocket section 171. This resistance to the water pressure is dependent on the amount of material collected in the separating pocket 175. If there is a large amount of material in this pocket, the resistance to the water pressure below the perforate plate 173 will be relatively great, and therefore will raise the water level in the separate compartment 185, which communicates with 171 through the duct 186. Such a condition is a signal for increased or accelerated discharge. Contrariwise, a low level of material in the separating pocket 175 will lessen the resistance to the water pressure obtaining in 171, and the liquid level in the control compartment 185 drops as a signal for slowing down or even for stopping the discharge operation of the valve.

In the compartment 185 is provided a float 190. The stem 191 is pivotally connected at 192 to a lever arm 193 which is journalled at 194 on a standard 200 mounted, for example, on the wall 201. The opposite arms 195 of the lever is pivotally connected at 196 with a link 197, the link being connected at 198 with an operating arm 199. The latter is pivotally connected at its other end with the arm 181 mounted on the shaft 180 of the valve. A bracket 202 may be attached to the wall 201 for pivotally mounting a curved arm 204 at point 203. The lower end of this arm is pivotally connected at 205 with a drive link 206 which connects with a crank arm 207 operable from a rotatable shaft 208. The link 199 is slidably mounted on the curved arm 204, as indicated in Fig. 8.

The crank drive 207/208 reciprocates the link 206, thereby imparting a swinging or pendulous motion to the curved arm 204. This motion is transmitted to the link 199 and therefore imparts an oscillating stroke drive motion to the arm 181 for moving the valve supports 179 and therewith the plunger or scraper member 178. If the link 199 is in its lowermost position on the curved arm 204, it will receive the maximum displacement as determined by the crank arm 207. The valve therefore discharges with each stroke the maximum amount of material. Such operation should take place at a time when there is a great amount of material accumulated in the pocket 175, presenting a relatively great resistance to the flow of water rushing up from below through the perforate plate 173. The increased resistance displaces the water through the duct 186 into the float compartment 185, raising the float and therefore displacing the arms 193/195 in clockwise direction, thus lowering the pivot point 198 and with it the operating link 199 on the curved arm 204. On the other hand, if the material level in the pocket 175 drops, the resistance to water pressure will drop, and accordingly the liquid level in the float chamber 185 drops, lowering the float so as to move the lever 193/195 in counter-clockwise direction to raise the pivot point 198 and with it the link 199 into a higher position on the curved arm 204.

The operative adjustment of the discharge stroke of the valve is thus entirely automatic in accordance with momentary requirements of the machine.

Attention is again called to the fact that Fig. 7 is purely diagrammatical and is intended only for explanatory purposes. It will be clear that the various parts can be properly dimensioned and placed so that the link 199 can be moved on the curved arm 204 under the control of the float 190 to a high position where practically no reciprocating motion is transmitted to this link (zero discharge) and for dropping the link with respect to the curved arm 204 so as to provide for maximum reciprocating displacement as determined by the crank 207.

Gang operation can also be provided in the case of the structure shown in Fig. 7. The drive link 206 may be part of a common drive which connects with a plurality of individual control mechanisms of several cells or separators, or units of one separator, in substantially the same manner, for example, as the common drive 150 in Fig. 5 connects with a plurality of individual valve drives.

The requirements which were initially stated to be desirable and to be the objects of this invention are fulfilled in all the embodiments shown. The valves can be operated within a certain predetermined range from zero to maximum discharge operation; the discharge is uniform in any adjusted position; the valves have no tendency to clog, jam or pack; they operate positively and reliably; and they provide for acceleration and slowing-down of the discharge or delivery of the material. The valves are also adapted to handle any admixtures that may occur in the material, and are adapted for gang operation as well as for coordination with other valves that may be provided in such machines for the purpose of controlling the flow of material either for supply or for discharge. The uniform and unobstructed discharge without packing, jamming or clogging is promoted by the provision of a discharge or delivery passage (formed by the stationary tray (fixed subfloor) or its equivalent and the casing through which or into which the material is to be moved) having in every embodiment a cross-sectional area or capacity which is at least as great as or is comparable to that of the supply or feed chute or duct through which the material is fed to the device. This may be demonstrated by examining, for example, Fig. 2. The stationary tray on subfloor 45 may also be considered in the nature of a partition for receiving material from the duct or chute 19' for delivery into the compartment 29'. The cross-sectional area or capacity of the passage provided between the right hand edge of such partition and the housing may be similar to or, if desired, may be greater than that of the chute 19'. The conditions in each and every embodiment are similar.

The examples given herein do not exhaust the possibilities of the invention, and are not intended to indicate any limitation inherent in the invention. The new valve and its control and operating principles may be applied to advantage in other types of machines aside from those described.

Changes may be made within the scope and spirit of the appended claims, wherein we have defined what is believed to be new and what we desire to have protected by Letters Patent of the United States.

We claim as our invention:

1. A device for controlling the movement of material which tends to gravitate in bulk in a predetermined direction comprising a stationary and a movable tray constituting a support on which said material can mass at an angle of repose which tends to inhibit its free gravitational movement, scraper means coacting with said movable tray and forming part of an operating means for successively discharging from said support uniform measured amounts of material, actuating means for reciprocating the movable tray and the scraper means, constant stroke drive means for said actuating means, and means governed by the amount of material to be controlled by said device for automatically adjusting the operatively effective drive stroke of said actuating means.

2. In combination with means forming a passage for a segregated material tending to move therethrough downwardly in bulk, a support disposed within and across said passage on which said material can mass assuming thereon a position in which its downward movement is substantially inhibited, discharge means movably mounted above said support for successively removing from the material massed thereon substantially uniform amounts, actuating means for reciprocating said discharge means, uniformly operating drive means for said actuating means, and variably adjustable gear means interposed between said drive means and said actuating means for determining the reciprocating stroke of said discharge means; said gear means comprising a drive member hingedly mounted at one end and secured to said uniformly operating drive means at the other end, an arm hingedly connected with said actuating means at one end, means for adjustably mounting the other end of said arm on said hingedly mounted drive member, and means governed by the amount of material accumulated in said passage above said support for adjusting the position of said arm on said drive member.

3. A device for controlling the movement of segregated material comprising a member forming the stationary floor of a downwardly directed material passage through which said material tends to gravitate downwardly in bulk, a stationary and a movable tray disposed adjacent the lower end of said floor and constituting a support on which said material can mass at an angle of repose which tends to inhibit its free gravitational downward movement, scraper means coacting with said movable tray and forming part of an operating means for successively discharging from said support uniform measured amounts of material, actuating means for reciprocating the movable tray and the scraper means, constant stroke drive means for said actuating means, and means governed by the amount of material to be controlled by said device for automatically adjusting the operatively effective drive stroke of said actuating means.

4. A device for controlling the movement of segregated material comprising a member forming the stationary floor of a downwardly directed material passage through which said material tends to gravitate downwardly in bulk, means forming a movable tray disposed immediately below and adjacent to the lower end of said stationary floor, means forming a stationary tray disposed immediately below and adjacent to said movable tray and forming therewith a support on which said material can mass at an angle of repose which tends to inhibit its free gravitational downward movement, scraper means coacting with said movable tray and forming part of an operating means for successively discharging from said support uniform measured amounts of material, actuating means for reciprocating the movable tray and the scraper means, constant stroke drive means for said actuating means, and means governed by the amount of material to be controlled by said device for automatically adjusting the operatively effective drive stroke of said actuating means.

5. A device for controlling the movement of segregated material comprising a member forming the stationary floor of a downwardly directed material passage through which said material tends to gravitate downwardly in bulk, means forming a movable tray disposed immediately below and adjacent the lower end of said stationary floor, means forming a stationary tray disposed immediately below and adjacent said movable tray and forming therewith a support on which said material can mass at an angle of repose which tends to inhibit its free gravitational downward movement, means on said movable tray forming a scraper for successively discharging from said stationary tray substantially uniform amounts of material, actuating means for reciprocating the movable tray and the scraper means thereon, constant stroke drive means for operating said actuating means, and means governed by the amount of material to be controlled by said device for adjusting the operatively effective drive stroke of said actuating means.

6. A device for controlling the movement of segregated material comprising a member forming the stationary floor of a downwardly directed material passage through which said material tends to gravitate downwardly in bulk, means forming a stationary subfloor disposed below the lower end of said floor and spaced therefrom, said stationary subfloor forming a support on which said material can mass at an angle of repose which tends to inhibit its free gravitational downward movement, shield means forming a tray-like movable subfloor disposed between said stationary subfloor and the lower end of said stationary floor, scraper means carried by said shield means, actuating means for alternately moving said shield and said scraper means in a forward drive stroke away from the lower end of said stationary floor and retracting said shield means in a return stroke in back of said lower end of the stationary floor whereby amounts of material massed on said support are successively discharged therefrom over one edge thereof, actuating means for operating said shield means and the scraper means thereon to effect the alternate drive and return stroke movement thereof, and responsive to the pressure of the mass of material accumulated for discharge above said device for adjusting the operatively effective stroke of said actuating means to determine the amounts of material discharged with each stroke.

RAYMOND G. LAWRY.
CARL V. ORE.